Jan. 2, 1962   A. G. O. GLEMBRING   3,015,376
APPARATUS FOR RECEIVING, ASSORTING AND
STORING OF RETURNED EMPTY BOTTLES
IN SHOPS AND THE LIKE
Filed March 16, 1959   5 Sheets-Sheet 1

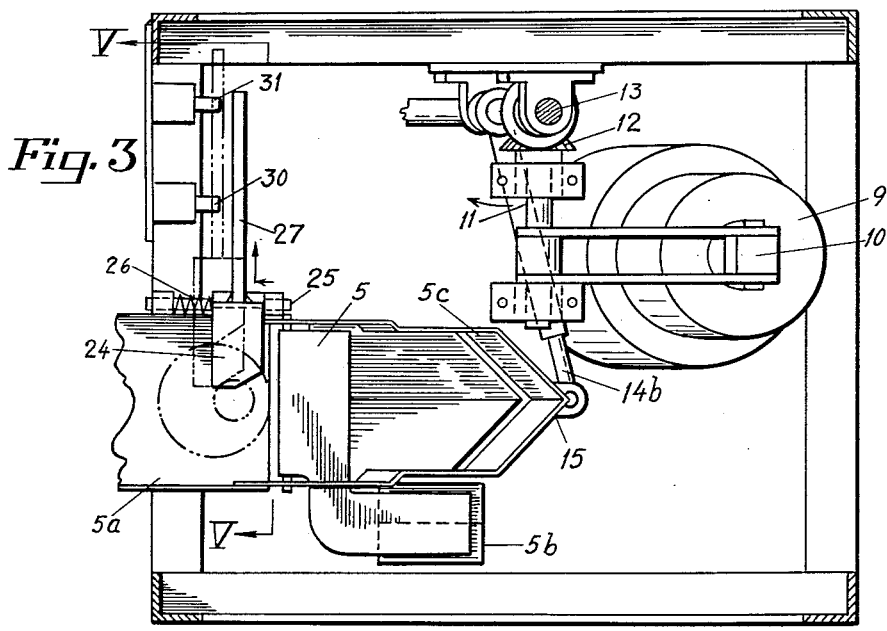
Fig. 3
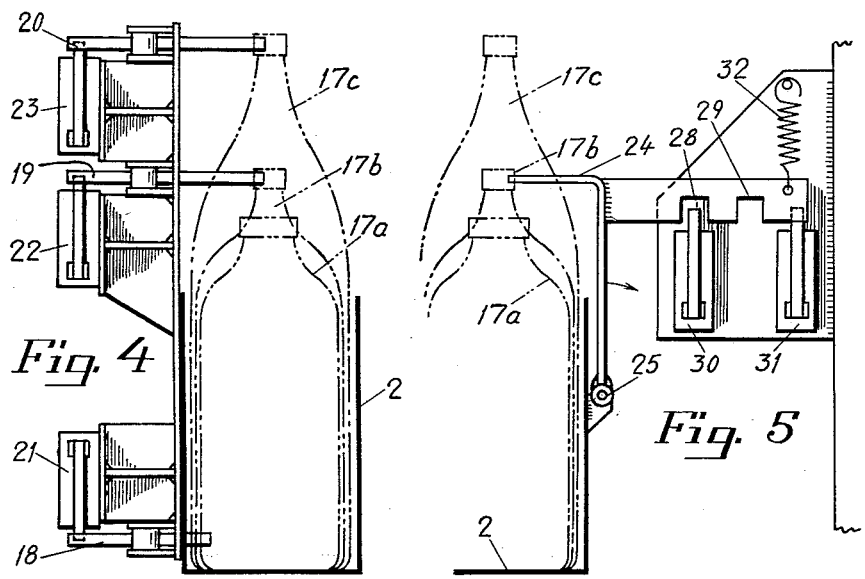
Fig. 4
Fig. 5

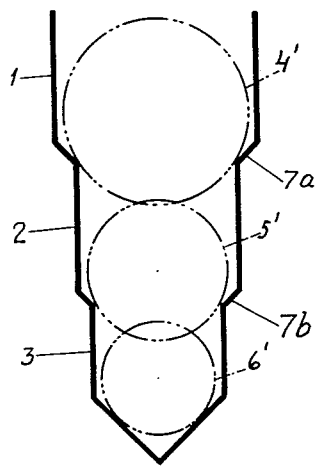
Fig. 6
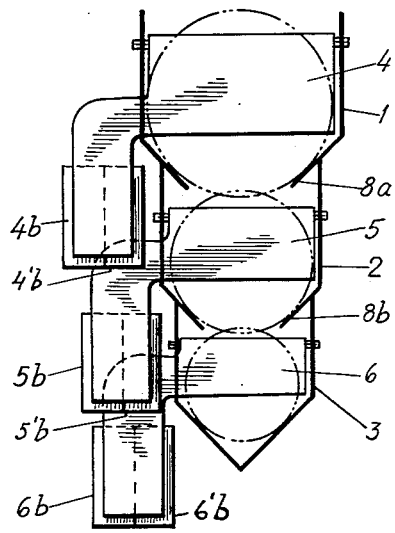
Fig. 7
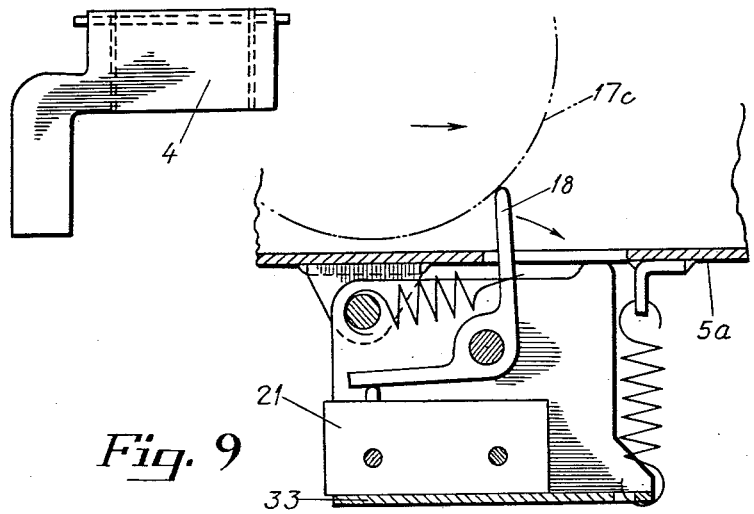
Fig. 8
Fig. 9

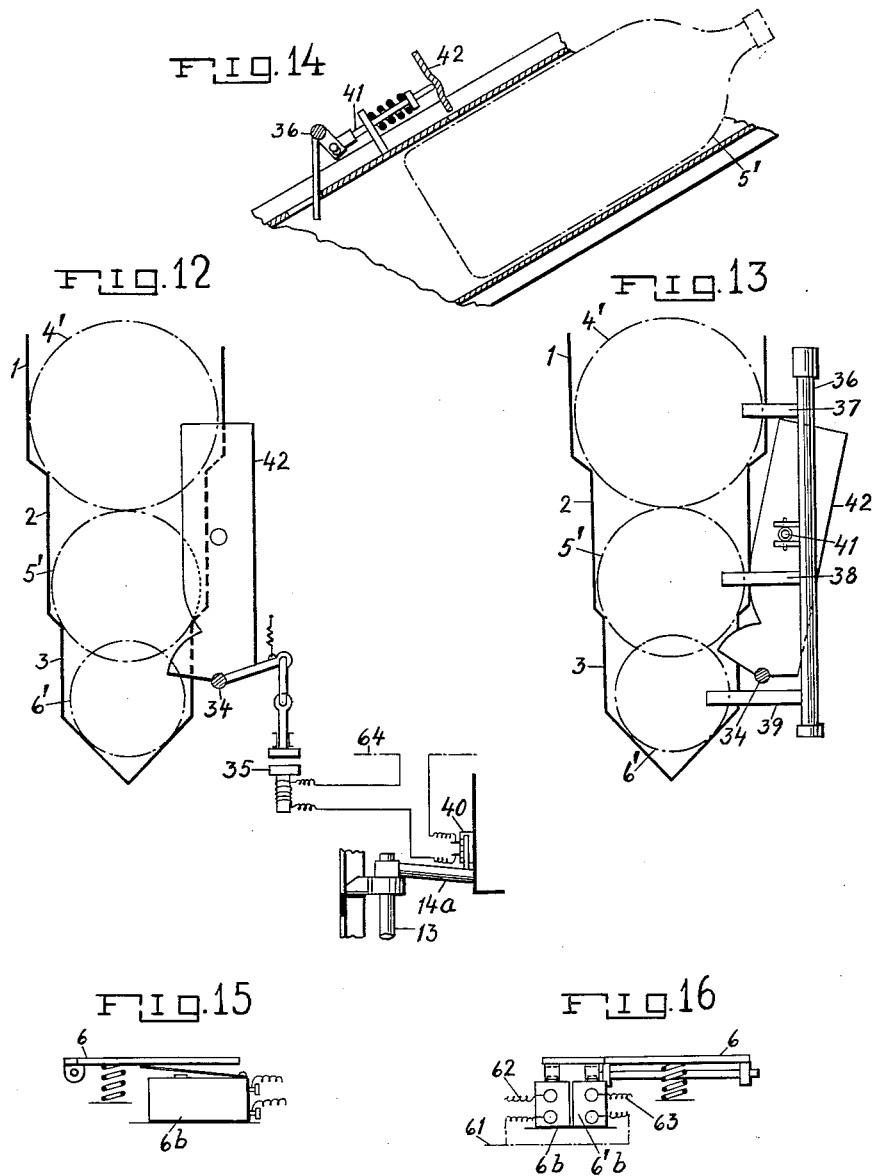

United States Patent Office 3,015,376
Patented Jan. 2, 1962

3,015,376
APPARATUS FOR RECEIVING, ASSORTING AND STORING OF RETURNED EMPTY BOTTLES IN SHOPS AND THE LIKE
Allan Gustaf Otto Glembring, 19B Norra Gubberogatan, Goteborg, Sweden
Filed Mar. 16, 1959, Ser. No. 799,727
Claims priority, application Sweden Mar. 18, 1958
8 Claims. (Cl. 194—4)

The present invention relates to an improved apparatus for receiving, assorting and storing of returned empty bottles for milk, refreshing drinks and the like in shops and stores in order to free the employees from this work and improve the selling service.

One object of the invention is to provide a fully automatic-working bottle-receiving apparatus effecting a matching and separation of bottles of different sizes.

Another object of the invention is to provide a fully automatically operating bottle-receiving apparatus for assorting and distributing bottles of different sizes to different storing places.

A further object of the invention is to provide a fully automatically operating bottle-receiving apparatus where the bottles are assorted and given an upright position within the apparatus itself before being moved off for storing.

A still further object of the invention is to provide a fully automatically operating bottle-receiving apparatus with a great capacity but with a comparably small need of space.

With these and other objects in view the invention essentially consists in an apparatus for receiving, assorting and storing of returned empty bottles, where the bottle-assorting arrangement is concentrated immediately within the intake end of the apparatus wherefrom a number of guiding paths for bottles of different thickness are directed downwards with such a steepness that the bottles, placed in the intake end with their bottom foremost, will slide down the guiding paths to upright position onto stop members, discharge devices for the bottles being disposed at the stop locations and moved by an electric motor operating means, said stop members being movably controlled for the starting of the motor.

Figure 1:
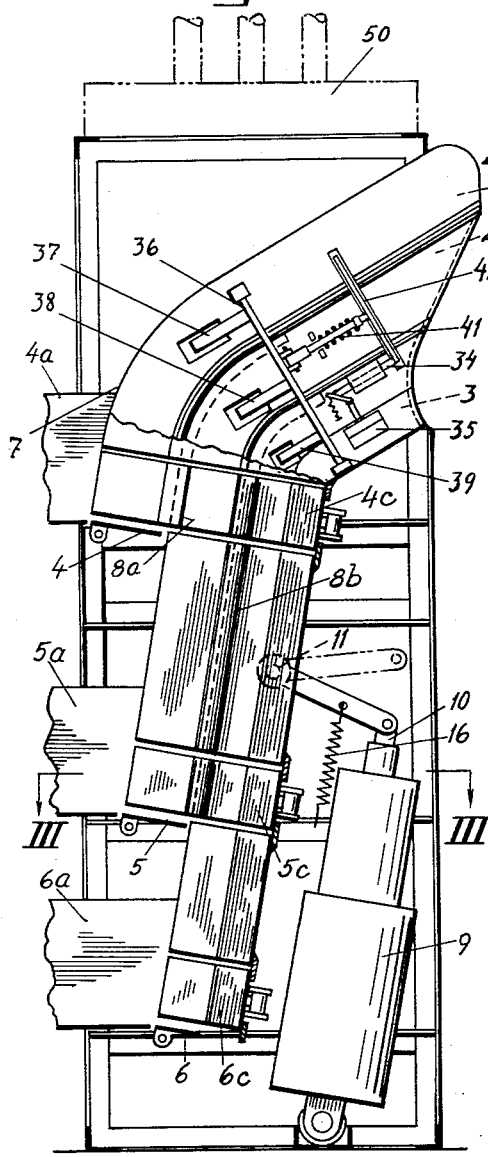
Figure 2:
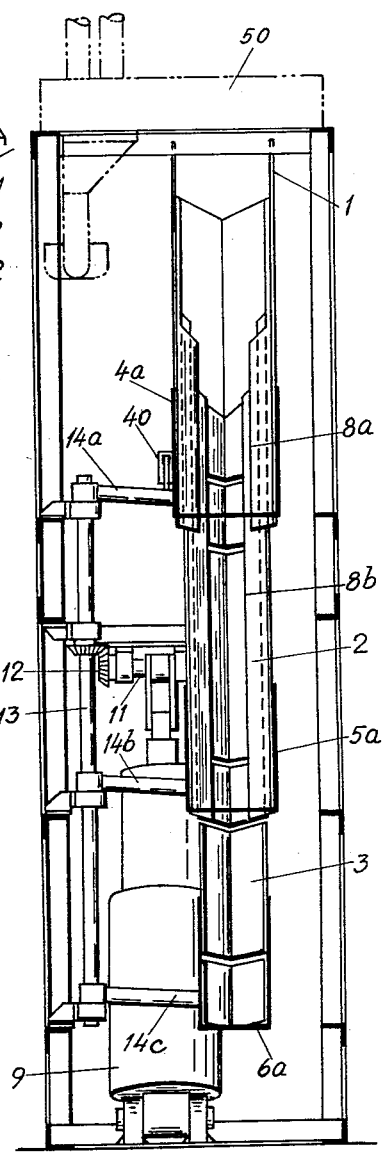
Figure 10:
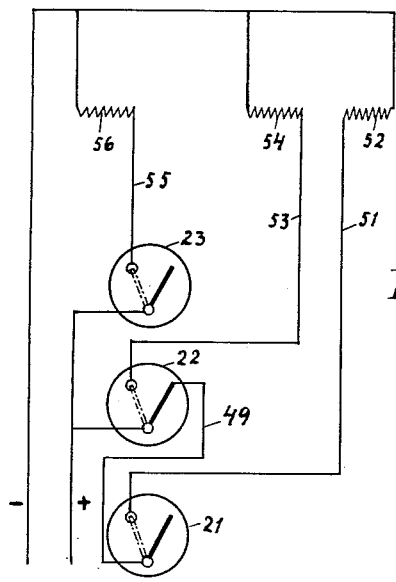
Figure 11:
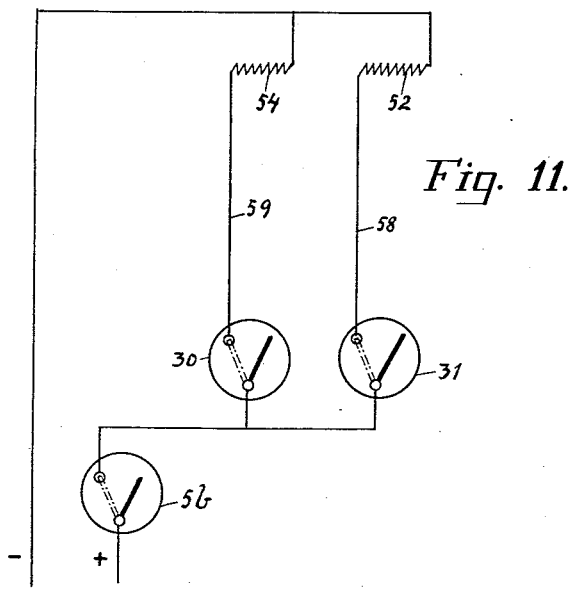

In the accompanying drawings:
FIGURE 1 is a side view partly in section, and
FIGURE 2 a view seen from behind.
FIGURE 3 is a horizontal section in a larger scale along the section line III—III in FIGURE 1.
FIGURE 4 is a view of a detail, and
FIGURE 5 a vertical section along the section line V—V in FIGURE 3 with some details modified with respect to the details in FIGURE 4.
FIGURE 6 is a cross section of the guiding paths close to the intake end of the apparatus in a scale corresponding to the scale of FIGURE 3, and
FIGURE 7 is a corresponding cross section of the guiding paths at a down bend of said paths in FIGURE 1.
FIGURE 8 shows a plan view of a stop plate and
FIGURE 9 a plan view of the operative position of the lowest switch in FIGURE 4, both figures being on a larger scale.
FIGS. 10 and 11 are circuits showing the operation of the switches for controlling the disc delivery device.
FIG. 12 is an end view similar to FIG. 6 showing a single shutter for the three channels together with its operating mechanism.
FIG. 13 shows the same view as FIG. 12 with the shutter moved to a free position together with the feeler members for the bottles.
FIG. 14 is a cross-sectional view longitudinally of the intermediate channel with the shutter outwardly thereof.
FIGS. 15 and 16 show the details of a stop plate for operating a micro-switch which is shown diagrammatically in FIG. 7.

In the embodiment of the bottle-receiving apparatus shown in the drawings the guiding paths for bottles of different diameters consist of a channel arrangement built up for instance of three trough-like channels 1, 2, 3 above each other to be used for three bottles 4', 5', 6' of different diameters.

The widths of the channels are different and suited to the different diameters of the bottles, the uppermost channel 1 for the widest bottle, and the lowermost channel 3 for the narrowest one 6'. The side walls of the uppermost channel 1 are joined to the side walls of the middle channel 2 by inclined bottom portions 7a, and the side walls of the middle channel joined to the side walls of the lowermost one 3 by inclined bottom portions 7b. Only the lowermost channel 3 has a solid bottom by inclined bottom portions joining each other, and the other two channels have open bottoms. The bottom portions of the channels are the guiding paths for the bottles. Said bottom portions have the shape shown in FIGURE 6, only in the vicinity of intake end A for the bottles, but only the uppermost channel 1 is open forwardly at this end to receive bottles of all diameters inserted thereinto with their bottoms foremost. At a downbend 7 of the guiding paths the bottom portions 7a, 7b are made longer creating guards 8a, 8b to prevent the narrower bottles from being flung out under the influence of the centrifugal force. All the guiding paths have such inclinations that the bottles will automatically slide downwards along their channels. The channels preferably have different lengths, the one for the widest bottle being the shortest and the one for the narrowest bottle being the longest as shown in FIGURE 1. The channels are at their lower ends provided with stop plates 4, 5, 6 for the bottles and the bottles arrive at the plates in upright position. The stop plates lie close to corresponding horizontal channels 4a, 5a, 6a leading to storage locations, and the bottles are shoved over from the stop plates to these channels by discharge members or outdrivers. As the stop plates lie on different levels it is possible to remove different bottles immediately providing the apparatus with a great capacity and a comparably small need of space. On account of the arrangement of the trough-like channels above each other at the intake end of the apparatus and in the shape shown, the assorting of the bottles occurs immediately at said intake end, viz the widest bottle remains in the uppermost channel 1, the middlesized bottle falls automatically into the middle channel 2 and the narrowest bottle into the lowermost channel 3.

The stop plates are yieldingly, for instance, pivotably arranged, and coact by their moving with electric contacts to close circuits for different purposes. Electric impulses thus produced are used to start an electro-hydraulic motor assembly of known kind for the discharge members as well as to operate an additional apparatus 50 also of known kind, for delivering receipt disks or tickets and for ticket printing. In the embodiment shown each stop plate acts on a micro-switch 4b, 5b, 6b to start the motor for the discharge members and the stop plates 4, 5 and 6 also have underlying micro-switches 4'b, 5'b, 6'b (FIG. 7) as electric circuit-contacts for the disk-delivering apparatus. The lead line 61 for the micro-switches, exemplified as 6b and 6'b in FIG. 16 is connected to one contact of each, and the lead 62 from the other contact 6b extends to the start contact, not shown, of the electro-hydraulic motor. A lead 63 from the other contact 6'b extends to the start contact, not shown, of the ticket delivering apparatus 50.

In the electro-hydraulic motor assembly 9 for the discharge members its piston rod 10 will turn a shaft 13 with the help of an intermediate horizontal shaft 11 and a bevel wheel gear 12. The shaft 13 extends along the upright channels and radial arms 14a, 14b, 14c from the shaft 13 are linked to the corresponding discharge members 4c, 5c, 6c. Each discharge member has the shape of a cutout portion of the channels, the first one 4c including all three channels, the middle one 5c the two narrower channels and the lowermost one 6c the narrowest channel 3 only. Thus each discharge member being a cutout portion of the channels or channel, has the shape of a bow without cover and bottom and the lower edge of the bow is on the level with the upper surface of the corresponding stop plate. The back of the bow is linked to the corresponding radial arm 14a, 14b, 14c. All the discharge members are shoved outwards, simultaneously acted upon by the said arms, if a bottle has reached a stop plate and has started the motor. Said bottle is then shoved out onto the horizontal or inclined channel leading to the storage location or to a transporting device. When the bottle leaves the stop plate, this stop plate moves upwards to its original position, being acted simultaneously upon by a weight or a spring. The stop plate simultaneously breaks the current to the electro-hydraulic motor and the piston of the same as well as its radial arms return to inactive position by means of the pressure of a spring 16.

One of the storage channels, suitably the middle one 5a, and the corresponding stop plate 5 are arranged to receive bottles 17a, 17b, 17c of different heights but of the same width. Feeler levers 18, 19, 20 (FIGURE 4) are here supplied for the circuit contacts for controlling the disk-delivering apparatus 50. Of these feelers, the one 18 lies lowermost for all bottles 17a, 17b and 17c, the uppermost one 20 is intended to touch the head of the longest bottle 17c, and the middle one 19 to touch the head of a bottle 17b of middle size when the bottles are shoved off from the stop plate 5. The intention is to close different circuits to said disk-delivering apparatus to control this apparatus to give out different disks or a different number of disks corresponding to different values of the bottles.

The lowermost feeler 18 has functions similar to that previously mentioned for the other stop plates, viz to close a switch for all arriving bottles independently of their different heights when the feeler is turned by an outmoving bottle. As the narrowest bottle 17a, however, does not reach up to the feelers 19, 20 this bottle will close solely one circuit 49, 51 by the switch 21 shown, whereat the circuit 49 passes through the contact arm of the switch 22, and said circuit 49, 51 is adapted to control the disk-delivering apparatus to deliver, by a portion 52, such as the coil for an electromagnet, one disk for instance a blue one. For the bottle 17b of middle size the arrangement is such that the head of the bottle at first moves the feeler 19 to act upon its switch 22, which, being by the circuit 49 as indicated in FIG. 10 connected up in series with the lowermost switch 21, will in a manner known by persons skilled in the art disconnect the latter before the same is acted upon by its feeler 18, on account of which the disk delivering apparatus will by another portion 54 deliver a different disk, for instance a red one corresponding to the value of the middle-sized bottle. The largest bottle 17c will act upon the two feelers 19, 20 with their switches 22, 23, cutting out the action of the lowermost switch 21 and causing by the portion 54 and another circuit 55 and portion 56 the disk-delivering apparatus to deliver two disks, for instance a red one and a green one, corresponding to the value of the largest bottle. The lowermost feeler 18 and its switch 21, for instance a micro-switch, is as shown in FIGURE 9 preferably placed on a pivotable holder 33, so that the feeler as well as the switch are able to be swung aside, in order to reduce the deflection of the feeler.

It is also possible to provide operation by solely one feeler for all the three bottles of different heights and for which the middle stop plate 5 is used. This embodiment is shown in FIGURES 3 and 5, and in this arrangement the micro-switch 5′b is maintained for the stop plate 5 instead of the last mentioned lowermost feeler. An upright feeler in the shape of an angle with a horizontal arm 24, said feeler being pivotable on a pivot pin 25 in the cross direction of the horizontal channel 5a has its end portion bent at an angle above said channel in a position to touch the head of the middle-sized bottle 17b when this is shoved off from the stop plate. The arrangement is such that the feeler is able to slide a short way along the pivot pin against the pressure of a spring 26 and, as said, also to pivot perpendicularly to the channel. The feeler is provided with an additional arm 27 directed away from the channel to coact alternately with two switches 30 and 31. For this purpose the arm is provided with two notches 28, 29 in a row, of which the notch 28 opposes the switch 30 and the outermost notch 29 is situated between the two switches, as seen in FIGURE 5, when the feeler is not in touch with a bottle. A spring 32 maintains the feeler in this neutral position. The end of the horizontal angle arm 24 is preferably chamfered, as seen in FIGURE 3. The switch 5′b is connected up in series with the two switches 30, 31, and is closed by all the arriving bottles. The pivoting of the feeler is caused by the two largest bottles and the sliding movement of the same is caused by the discharge member only which will knock against the hub of the feeler when the discharge member moves outwards.

The smallest bottle 17a does not reach up to the angle arm of the feeler and will close the stop plate switch 5b only. Thus the feeler is not swung out but is pushed by the discharge member so that the outermost switch 31 is closed, and as this is connected up in series with the switch 5b the circuit 58 is complete and the disk-delivering apparatus 50 will by its portion 52 deliver for instance a corresponding blue disk. When a bottle 17b of middle size is pushed out by the discharge member 5c the head of the bottle will turn the angle arm a short way so that the contact arm 27 will cover the inner switch 30 but the notch 29 will oppose the outer switch 31. When the discharge member then knocks against the bearing of the feeler and pushes the feeler axially the feeler will close the inner switch 30, and another circuit 59 as the one previously mentioned is closed for another portion 54 of the disk-delivering apparatus and a disk of another sort, for instance a red one, is delivered. When, however, the largest bottle 17c is pushed out the feeler will turn a greater degree so that no notch will oppose the two switches and on account thereof both the switches will be acted upon by the contact arm closing the two circuits 58, 59 to the disk-delivering apparatus which may in this case deliver two disks. Thus the result aimed at is obtained by one feeler only.

It is of importance for the right function of the apparatus that no bottle will be permitted to slide down before a previous bottle has been pushed out by the discharge member. For this reason a swingable shutter 42 in the vicinity of the intake end of the apparatus is mounted on a pivot pin 34, which is turned in one way by an electromagnet 35 to turn the shutter from inside out of the channels 1, 2, 3 to free the passages for the bottles, and in another way by a spring to turn the shutter in again. The electromagnet is energized from a lead 64 by a switch 40 acted upon by the arm 14a and closes the circuit for a short moment when any of the discharge members has finished its return movement. A shaft 36 positioned in the cross direction of the channels exteriorly thereof and below the shutter is provided with three fingers 37, 38, 39, extending through windows into the corresponding three channels in the passageway for the bottles. The shaft has a radial arm linked to a locking pin 41 for the shutter which pin is actuated by a spring to extend into a recess in the shutter to hold back the shutter in its outward position. When a bottle is sliding down its channel and knocks against the corresponding finger this finger is moved outwards and turns the shaft 36 to withdraw the locking pin from the shutter, which shutter is moved into the channels by its spring and blocks all three channels against the downsliding of further bottles. When the first bottle has arrived at its stop plate and been shoved out by its discharge member the return movement of the latter will cause the magnet 35, energized by the switch 40, to move the shutter outwards where the shutter is locked by the locking pin acted upon by its spring. During the movement of the shutter the pin is held in touch with the surface of the shutter by the spring, and the insertion of the pin into the recess will turn the shaft 36 to bring the fingers into the channels again, and the channels are now free for further bottles.

By the apparatus described above empty bottles are received, assorted and delivered in accordance with their respective sizes to different storing places and the customer receives a receipt at the same time. Thus the customer always has a proof for each empty bottle, he has returned and can use this upon buying a new full bottle. The construction of the disk delivering apparatus per se is no part of the present invention.

In the drawings and specification there has been set forth a preferred embodiment of the invention, and although specific terms are employed, they are used in a generic and descriptive sense only and not for purposes of limitations, the scope of the invention being defined in the claims.

What I claim is:

1. An apparatus for receiving, assorting and storing of returned empty bottles for milk, refreshing drinks and the like in shops and stores comprising a plurality of inclined guide members forming respective paths for bottles of different sizes from an intake end adjacent the upper end of each guide member to respective stop plates at the lower end of each guide member, a movable discharge member for the bottles at each stop plate to displace the bottles into transversely extending store channels, the guide paths being in the shape of trough-like channels in a number corresponding to the number of different diameters of bottles and each of a width suited for a different bottle diameter, and an assorting device in the vicinity of the intake end for distributing the bottles to the guide members in accordance with the bottle diameters.

2. An apparatus for receiving, assorting and storing of returned empty bottles for milk, refreshing drinks and the like in shops and stores comprising a plurality of inclined guide members forming respective paths for bottles of different sizes from an intake end adjacent the upper end of each guide member to respective stop plates at the lower end of each guide member, a movable discharge member for the bottles at each stop plate to displace the bottles into transversely extending store channels, the guide paths being in the shape of trough-like channels in a number corresponding to the number of different diameters of bottles and each of a width suited for a different bottle diameter, and an assorting device in the vicinity of the intake end for distributing the bottles to the guide members in accordance with the bottle diameters, the assorting device including a channel member corresponding in width to and forming a continuation of each guide member adjacent the upper end thereof and assembled one above the other, the widths of the channels in the members decreasing progressively from top to bottom of the assembly, all of the channel members except the bottommost one having bottom openings which decrease in width progressively from top to bottom of the assembly to permit distribution of bottles of various widths to the proper guide members when placed in the uppermost channel member.

3. An apparatus for receiving, assorting and storing of returned empty bottles for milk, refreshing drinks and the like in shops and stores comprising a plurality of inclined guide members forming respective paths for bottles of different sizes from an intake end adjacent the upper end of each guide member to respective stop plates at the lower end of each guide member, a movable discharge member for the bottles at each stop plate to displace the bottles into transversely extending store channels, the guide paths being in the shape of trough-like channels in a number corresponding to the number of different diameters of bottles and each of a width suited for a different diameter, and an assorting device in the vicinity of the intake end for distributing the bottles to the guide members in accordance with the bottle diameters, the guide members extending from the assorting device with a curve directing the paths downwards with such a steepness that the bottles arrive at the stop plates in upright position, the stop plates being yieldably mounted a switch operated by each stop plate upon movement thereof in response to impact of a bottle thereon and motive means controlled by operation of the switches for moving the discharge members to displace a bottle from the stop plate.

4. An apparatus for receiving, assorting and storing of returned empty bottles for milk, refreshing drinks and the like in shops and stores comprising a plurality of inclined members forming respective paths for bottles of different sizes from an intake end adjacent the upper end of each guide member to respective stop plates at the lower end of each guide member, a movable discharge member for the bottles at each stop plate to displace the bottles into transversely extending store channels, the guide paths being in the shape of trough-like channels in a number corresponding to the number of different diameters of bottles and each of a width suited for a different bottle diameter and an assorting device in the vicinity of the intake end for distributing the bottles to the guide members in accordance with the bottle diameters, the guide members extending from the assorting device with a curve directing the paths downwards with such a steepness that the bottles arrive at the stop plates in upright position, the stop plates being yieldably mounted arranged for the impact of the bottle and by the yielding brought in coaction with switches for electric circuits to energize an electric motor assembly in coaction with the discharge members, each of the discharge members being a transversely movable section of the guide member with which it is associated.

5. An apparatus for receiving, assorting and storing of returned empty bottles for milk, refreshing drinks and the like in shops and stores comprising a plurality of inclined guide members forming respective paths for bottles of different sizes from an intake end adjacent the upper end of each guide member to respective stop plates at the lower end of each guide member, a movable discharge member for the bottles at each stop plate to displace the bottles into transversely extending store channels, the guide paths being in the shape of trough-like channels in a number corresponding to the number of different diameters of bottles and each of a width suited for a different bottle diameter, and an assorting device in the vicinity of the intake end for distributing the bottles to the guide members in accordance with the bottle diameters, the guide members extending from the assorting device with a curve directing the paths downwards with such a steepness that the bottles arrive at the stop plates in upright position, the stop plates being yieldably mounted arranged for the impact of the bottle and by the yielding brought in coaction with switches for electric circuits to energize an electric motor assembly in coaction with the discharge members, pivotable feelers positioned in the vicinity of the stop plate of at least one of the channels used for bottles of the same width but different length, said feelers, being positioned at a height to be engaged by the uppermost portions of bottles of predetermined heights when they are moved away from the stop plate, a switch operated by each of the feelers, a ticket delivering device, and means controlled by each of the switches upon operation thereof for operating the ticket delivering device to deliver a ticket.

6. An apparatus for receiving, assorting and storing of returned empty bottles for milk, refreshing drinks and the like in shops and stores comprising a plurality of inclined guide members forming respective paths for bottles of different sizes from an intake end adjacent the upper end of each guide member to respective stop plates at the lower end of each guide member, a movable discharge member for the bottles at each stop plate to displace the bottles into transversely extending store channels, the guide paths being in the shape of trough-like channels in a number corresponding to the number of different diameters of bottles and each of a width suited for a different bottle diameter, and an assorting device in the vicinity of the intake end for distributing the bottles to the guide members in accordance with the bottle diameters, the guide members extending from the assorting device with a curve directing the paths downwards with such a steepness that the bottles arrive at the stop plates in upright position, the stop plates being yieldably mounted arranged for the impact of the bottle and by the yielding brought in coaction with switches for electric circuits to energize an electric motor assembly in coaction with the discharge members, pivotable feelers positioned in the vicinity of the stop plate of at least one of the channels used for bottles of the same width but different length, said feelers, being positioned at a height to be engaged by the uppermost portions of bottles of predetermined heights when they are moved away from the stop plate, a switch operated by each of the feelers, a ticket delivering device, and means controlled by each of the switches upon operation thereof for operating the ticket delivering device to deliver a ticket, the number of feelers being the same as the number of bottles of different length.

7. An apparatus for receiving, assorting and storing of returned empty bottles for milk, refreshing drinks and the like in shops and stores comprising a plurality of inclined guide members forming respective paths for bottles of different sizes from an intake end adjacent the upper end of each guide member to respective stop plates at the lower end of each guide member, a movable discharge member for the bottles at each stop plate to displace the bottles into transversely extending store channels, the guide paths being in the shape of trough-like channels in a number corresponding to the number of different diameters of bottles and each of a width suited for a different bottle diameter, and an assorting device in the vicinity of the intake end for distributing the bottles to the guide members in accordance with the bottle diameters, the guide members extending from the assorting device with a curve directing the paths downwards with such a steepness that the bottles arrive at the stop plates in upright position, the stop plates being yieldably mounted arranged for the impact of the bottle and by the yielding brought in coaction with switches for electric circuits to energize an electric motor assembly in coaction with the discharge members, pivotable feelers positioned in the vicinity of the stop plate of at least one of the channels used for bottles of the same width but different length, said feelers, being positioned at a height to be engaged by the uppermost portions of bottles of predetermined heights when they are moved away from the stop plate, a switch operated by each of the feelers, a ticket delivering device, and means controlled by each of the switches upon operation thereof for operating the ticket delivering device to deliver a ticket, only one feeler being in use for two of three bottles of different length, the feeler being pivotable in a direction transverse to the movement of the bottle when moved by the discharge member from the corresponding stop plate, as well as slideably arranged in the direction of the discharge member to be pushed against spring pressure a certain way by the discharge member, the feeler being in a position to touch the head of a middle-sized bottle and alternatively the breast of the largest bottle when the bottle is pushed out by the discharge member, said feeler being provided with an arm extending in a direction transverse to discharge movement of the bottle, said arm being provided with two edge notches in a row, the inner one opposing a contact of a switch when the bottle is in touch with the head of the middle-sized bottle, and the outer one opposing another switch when the feeler is pivoted out in touch with the larger bottle, so that the arm will in the first case close the outer switch and in the second case close the inner switch when the feeler is axially pushed by the discharge member, said switches being in different electric circuits, ticket delivering apparatus controlled by each of the circuits, said switches being connected up in series with a circuit closed by the stop plate at the arriving of a bottle.

8. An apparatus for receiving, assorting and storing of returned empty bottles for milk, refreshing drinks and the like in shops and stores comprising a plurality of inclined guide members forming respective paths for bottles of different sizes from an intake end adjacent the upper end of each guide member to respective stop plates at the lower end of each guide member, a movable discharge member for the bottles at each stop plate to displace the bottles into transversely extending store channels, the guide paths being in the shape of trough-like channels in a number corresponding to the number of different diameters of bottles and each of a width suited for a different bottle diameter, and an assorting device in the vicinity of the intake end for distributing the bottles to the guide members in accordance with the bottle diameters, a movable shutter disposed to be moved laterally into the paths by means of a spring to block the paths against following bottles when a first inserted bottle is sliding down a path, an electromagnet for moving the shutter out of said path when energized, a switch operated by the discharge devices in their return movement for energizing said electromagnet, a turnable shaft provided with a radial finger for each path, said fingers extending into the path of the bottles, a spring-actuated locking pin for the shutter, a radial arm on the shaft linked to the shutter to turn the shaft to bring the fingers into the paths at an axial movement of the pin into a locking recess in the shutter when the shutter reaches its outward position, the pin releasing the shutter when moved on account of an outswinging movement of the fingers when a bottle is passing.

References Cited in the file of this patent

UNITED STATES PATENTS

| | | |
|---|---|---|
| 1,901,528 | Olsen | Mar. 14, 1933 |
| 1,936,515 | Love | Nov. 21, 1933 |
| 2,804,958 | Garrard | Sept. 3, 1957 |